United States Patent
Petersson

(10) Patent No.: US 6,701,865 B2
(45) Date of Patent: Mar. 9, 2004

(54) MILKING INFLATION FOR AUTOMATIC MILKING MACHINES

(75) Inventor: Lennart G. Petersson, Douglas, MA (US)

(73) Assignee: IBA Inc., Millbury, MA (US)

( * ) Notice: Subject to any disclaimer, the term of this patent is extended or adjusted under 35 U.S.C. 154(b) by 0 days.

(21) Appl. No.: 10/246,239

(22) Filed: Sep. 17, 2002

(65) Prior Publication Data
US 2003/0051669 A1 Mar. 20, 2003

Related U.S. Application Data
(60) Provisional application No. 60/323,657, filed on Sep. 19, 2001.

(51) Int. Cl.⁷ .................................................. A01J 5/04
(52) U.S. Cl. .................................................. 119/14.47
(58) Field of Search ........................... 119/14.47, 14.48, 119/14.53

(56) References Cited

U.S. PATENT DOCUMENTS

| | | | | |
|---|---|---|---|---|
| 2,340,295 A | * | 2/1944 | Bender | 119/14.52 |
| 3,474,760 A | * | 10/1969 | Soddall et al. | 119/14.49 |
| 3,696,790 A | * | 10/1972 | Albright | 119/14.47 |
| 4,141,319 A | * | 2/1979 | Maier et al. | 119/14.47 |
| 4,372,250 A | * | 2/1983 | Larson | 119/14.47 |
| 5,245,947 A | * | 9/1993 | Oosterling et al. | 119/14.48 |
| 6,418,877 B1 | * | 7/2002 | Fredericks et al. | 119/14.47 |

FOREIGN PATENT DOCUMENTS

GB   2179231 A   *   3/1987   ............. A01J/5/08

* cited by examiner

*Primary Examiner*—Son T Nguyen
(74) *Attorney, Agent, or Firm*—Terry M. Crellin

(57) ABSTRACT

A milking inflation fits over the upper end of a teat cup shell, with a peripheral shoulder and cuff adapted to surround and sealingly engage the upper rim of the shell. A substantially flat, relatively thin section (mouthpiece) extends radially inwardly from the shoulder and toward a center portion which defines a circular central opening or mouth for receiving a teat of a lactating animal. A plurality of geometrically-shaped indentations are aligned in a circumferentially extending pattern around the mouth. The indentations are formed integrally in a broad surface of the mouthpiece and extend radially inwardly from the shoulder and cuff toward the center portion and central opening. The inward tips of the geometrical indentations leave a substantially raised portion around the center opening, and due to the alignment of the geometrical indentations there is an immediate raised portion around the central opening of the mouthpiece. The indentations provide improved flexibility for the mouthpiece which allows the mouthpiece to better adapt to various sizes of animal's teats. The immediate portion around the opening, with its raised portion, provides increased integrity and stability during the use of the milking inflation.

15 Claims, 1 Drawing Sheet

MILKING INFLATION FOR AUTOMATIC MILKING MACHINES

CROSS REFERENCE TO RELATED APPLICATION

This application claims the filing date of Provisional Application No. 60/323,657 filed on Sep. 19, 2001.

BACKGROUND OF THE INVENTION

The invention relates to inflations employed in automatic milking machines which are used in milking dairy cows. In particular, the invention relates to a plurality of geometrical indentations formed in a broad surface of the head of a milking inflation and in a circular pattern and radially placed around the circumference of a centrally placed opening in the broad surface of the head of inflations which receives a teat of a lactating animal such as a dairy cow.

Automatic milking machines incorporate milking inflations that are part of a vacuum system. The milking inflations are attached to respective teats of a lactating animal, and the vacuum system associated with the inflations automatically removes milk from the udder of the animal being milked. The area that is described as the surrounding structure of the opening of the milking inflations is defined as the mouthpiece and the opening itself as the mouthpiece opening. This area plays a significant role for providing stability and maintenance of vacuum while the milking inflation is attached to the animal for the purpose of the milk excretion process. The material, thickness, design and configuration of the mouthpiece govern the success a particular mouthpiece design will have during the milk excretion process. This success relates to the flexibility and integrity of a mouthpiece design. The shape and size of teats of animals being subjected to the milk excretion process by a milking inflation and milking machine system vary, even within particular breeds of animals. The general shapes of these teats are primarily conical and the size is described as variations in width and length. It is for these reasons that the designs of mouthpieces provide flexibility to properly seal around the circumference of the teat, yet provide integrity so that it does not prematurely fail in performance by allowing air to pass the area of attachment to the teat during the milking process.

OBJECTIVE AND BRIEF DESCRIPTION OF THE INVENTION

A principal objective of the invention is to provide a novel inflation in which the mouthpiece is designed to provide flexibility in crucial areas of the mouthpiece and integrity in other areas where additional integrity is needed for providing good milking performance during the process of use and especially during the aging of the material of the inflation. This objective is achieved by providing a plurality of geometrically-shaped indentations which are formed integrally as recessed indentations in the broad surface of the mouthpiece as will be fully described hereinafter. With the placement of the geometrical indentations, the area in the mid portion of the surface of the mouthpiece will have a greater amount of flexibility whereas the immediate area around the mouthpiece opening will have increased strength and integrity.

Good milking performance, as that relates to the design of the mouthpiece, is defined as the ability of the inflation to maintain a seal around the tissue of the teat of the animal without restricting fluid flow. As soon as the seal is broken, air will pass between the inflation and the wall of the teat creating instability inside the inflation. These instabilities may have adverse affects on milk flow, udder and teat health due to the possibilities of pathogen transfer through the streak canal of the animal. In the prior art (U.S. Pat. No. 4,372,250) the inventor discloses projections or ribs in the substantially flat, relatively thin section (mouthpiece) extending radially inwardly from the shoulder and cuff toward a center portion which defines a circular central opening or mouth for the purpose of receiving a teat of a lactating animal. The design of the mouthpiece of U.S. Pat. No. 4,372,250 is contrary to the design disclosed in this patent application.

Depending on the shape and design of the structural support piece, called a milking shell, which will govern the size and configuration of the mouthpiece, the number, size and shape of the novel geometrical indentations of the present invention. The indentations are sized, that is have a surface area, so that the indentations have a combined surface area that is equal to 25 to 65 percent of the surface area of the surface of the mouthpiece in which the geometrical indentations are formed. Relative to the size and dimensions of various mouthpieces, the relationship between recessed and raised will vary within the range as given above.

DESCRIPTION OF EXPERIMENTAL BASIS OF THE INVENTION

The parameters tested for the support of the invention are liner slippage and milking machine-on-time. To be able to evaluate the effect of the geometrical indentations in the mouthpiece, an appropriate control was established. The geometrical indentations were implemented to an already existing inflation, which would provide a difference between the control and the experimental groups as that of the geometrical indentations alone. The control design describes a mouthpiece design without the geometrical indentations and where the surface area has the same thickness as the recessed areas of the geometrical indentations. Liner slippage defines the event where the seal between the rubber inflation and the tissue of the teat is broken and consequently allows air into the inflation. This event causes irregular vacuum fluctuations at or near the end of the teat. These are undesirable events and should be prevented in part by designs of inflations. The liner slips documented are by definition described as audible liner slips and are noted by the milker and reported to the investigator. An objective evaluation as to the reasons for the liner slips to occur, was also recorded. The causes for these liner slips were grouped in two classifications, one due to size, shape, placement of teats and/or udder, as well as, placement and other factors relative to the milking machine. If a reason for the liner slippage to occur cannot be determined by the factors listed above, the cause for the liner slip was listed as the inflation itself. Milking machine-on-time by definition is the time that the milking machine is attached to the teat of the cow. The detachment process is initiated by an electronic a milk flow sensor which, automatically removes the milking machine when the fluid flow reaches preset levels. Since the milking parlors used in these studies do not have individual milking unit timers for measuring machine-on-time, the time from the first milking unit being attached to the last milking unit being removed in a specific group of cows in the milking parlor was measured, recorded and analyzed. This is not a true definition of machine-on-time, but for the sake of comparison of the two treatment applications the definition of "group machine-on-time" should be justified.

When the terminology of "reduction" is used it relates to the reduction of an event comparing the geometrical indentations placed on mouthpieces on an already existing inflation to the conventional design without the geometrical indentations on the same inflation design. The useful life of inflations is standardized at 1200 individual cow milkings (ICM) and in this study it was divided into three time frames defined as "interval". Interval 1 represents the first trimester of use. Interval 2 represents the middle trimester, and Interval 3 represents the last third of the inflation's useful life. Each time an evaluation was performed, the ICM was calculated and the interval was determined.

Liner Slippage:

The recorded reductions in liner slippage were 20% for Interval 1, 50% for Interval 2 and 71% for Interval 3. This would correlate to the hypothesis and the claim of the patent. Inflations are made from elastomeric materials and normal use and exposure to chemicals, inflations gradually wear out. However, this pattern would, by its design, help maintain improved performance over previous designs. The events of liner slips are reduced when using the geometrical indentations as compared to the control. These results would support the claim where the reduction in liner slippage would increase over the useful life of the inflation.

Machine-on-Time:

The milking parlor in this operation has 6 milking units on each side. One side had the conventional (control) inflation and the other side of the parlor had the same inflation design except that it had the pattern of geometrical indentations on the mouthpiece (experimental). This milking parlor has automatic milking machine detachers. The difference in machine-on-time for Interval 1 was 9 seconds. The conventional inflation recorded the shorter machine-on-time. For Interval 2 the differential was 1 minute 6 seconds. The experimental inflation had the shorter machine-on-time. For Interval 3 the differential was 58 seconds and the experimental inflation recorded the shorter machine-on-time. These results would support the claim where the reduction in machine-on-time would be more significant over the useful life of the inflation.

Evaluations on several other dairy operations also support this data. Although the data do not provide the same differences and values, the relative relationship between the control and experimental designs are supported. The explanation for the differences in specific values is largely due to the differences in the physiological configurations of udders and teats among farm operations. Patterns of geometrical indentations tested included a hexagonal shape, a round shape and an oval shape. All these patterns shapes were tested and show similar and same performance characteristics.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 3:
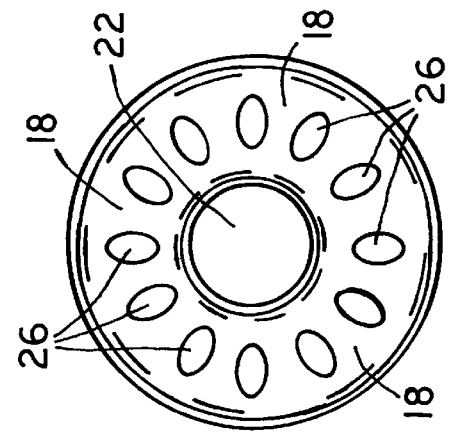
FIG. 3 is a view similar to that of FIG. 2, with the geometrical indentations having the shape of ovals.

Several embodiments of improvement in a milking inflation for a teat cup assembly in accordance with the present invention are shown in the accompanying drawings. The improvement of the present invention relates to otherwise conventional inflations which are characterized by the following characteristics:

(a) The inflations have a tubular body 12 that is adapted to fit within an elongate shell of a milking cup of an automatic milking machine. The shell of the milking cup is well known in the art and not illustrated in the drawings.

(b) The inflations have a head end portion 14 attached to an upper end of the tubular body 12. The head end portion 14 is adapted to fit over the upper end of the elongate shell to position the tubular body within the elongate shell as is conventional and well known in the art.

(c) The inflations have a peripheral cuff 16 on the head end portion. The peripheral cuff is adapted to surround and sealing engage the upper end of the elongate shell, again as is conventional and well known in the art.

(d) The inflations have a substantially flat, resilient mouthpiece 18 made of a flexible, elastomeric material. The mouthpiece has a thickness defined by an upper and a lower surface which extend radially inwardly from the cuff 16 toward a central axis 20 of the tubular body. Again, such substantially flat, resilient mouthpieces 18 made of a flexible, elastomeric material are conventional and well known in the art.

(e) The inflations have a circular, central opening 22 in the mouthpiece 18. The opening 22 is adapted to receive a teat of a cow as is conventional and well known in the art.

The improvement as disclosed and claimed consists of a plurality of geometrical indentations 26 formed in at least one of the upper and lower surfaces of the mouthpiece 18. The geometrical indentations 26 are spaced apart and oriented in a circular pattern around the central opening 22 in the mouthpiece 18. Preferably, as shown in the drawings, the geometrical indentations are equally spaced around the central opening 22 in the mouthpiece 18. Further, as pertains to individual inflations, the geometrical indentations 26 all have the same shape and dimensions.

Preferably, the geometrical indentations 26 in any individual inflation have a combined surface area that is equal to 25 to 65 percent of the surface area of the surface of the mouthpiece 18 in which the geometrical indentations 26 are formed. As shown in the drawings, the geometrical indentations 26 are preferably formed on the upper surface of the mouthpiece 18 simply for ease in manufacturing the inflation. It is expressly recognized that the geometrical indentations 26 could just as well be formed in the inner or bottom surface of the mouthpiece 18.

Preferably, the geometrical indentations 26 each have a depth that is substantially uniform, and the depth is substantially the same for each of the geometrical indentations 26 in any particular inflation. The depth is preferably equal to about 5 to 35 percent of the thickness of the mouthpiece 18.

Figure 2:
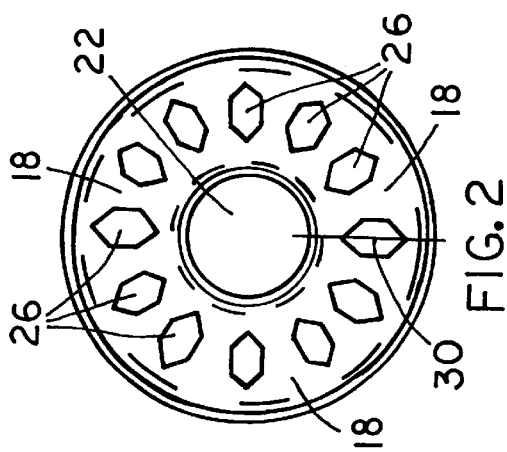
FIG. 2 is a plan view of the top of a milking inflation showing a pattern of geometrical indentations in the surface of the mouthpiece wherein the geometrical indentations have the shape of hexagons.

An embodiment of the present invention is shown in FIG. 2, in which the geometrical indentations 26 have the shape of a hexagon. In the embodiment shown in FIG. 2, the hexagon-shaped geometrical indentations 26 are oriented such that a center line 30 through a pair of opposite points of each respective hexagon-shaped geometrical indentation 26 intersects a center axis of the opening 22 in the mouthpiece 18, and two opposite sides of each respective hexagon-shaped geometrical indentation 26 are substantially parallel to the center line 30 of that respective geometrical indentation 26. As further shown in FIG. 2, it is preferable for each of the hexagon-shaped geometrical indentations 26 to be elongated in a radial direction from the center axis of the opening 22 in the mouthpiece 18 such that the two opposite sides of each of the geometrical indentations 26 are longer than mutually respective other sides of each of the geometrical indentations 26.

Figure 4:
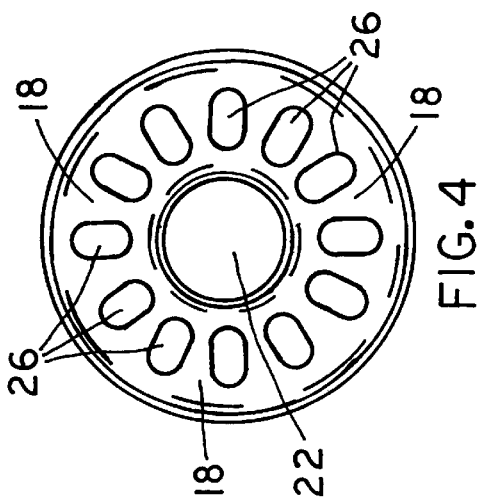
FIG. 4 is a view similar to that of FIG. 2, with the geometrical indentations having the shape of elongated rectangles except that the opposite longitudinal ends of the rectangles are replaced with arcuate shaped ends.
Figure 1:
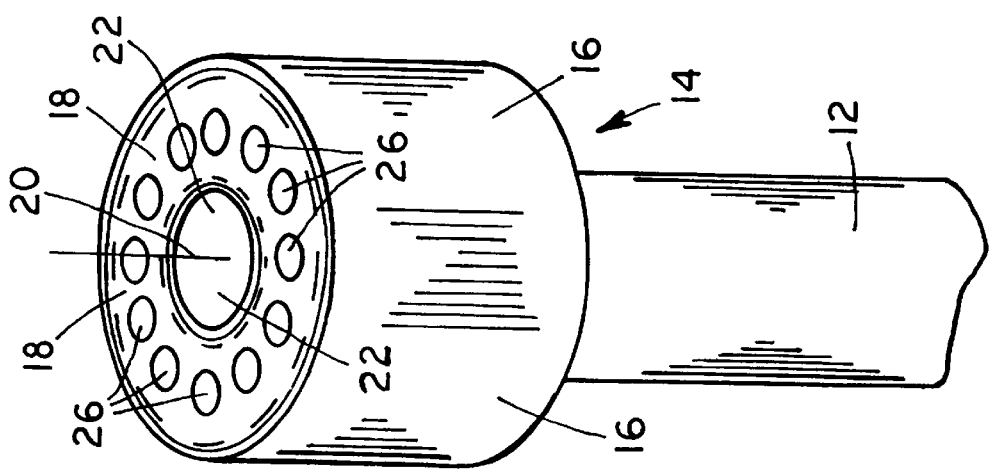
FIG. 1 is a pictorial representation of one embodiment of the present invention showing a plurality of geometrical indentations in the mouthpiece of a milking inflation wherein the geometrical indentations have the shape of circles.

Another preferred shape of the geometrical indentations 26 is that of a circle. An embodiment showing the shape of the geometrical indentations as circles is shown in FIG. 1. A modified embodiment showing elongated geometrical indentations 26 having two substantially straight opposite sides and two semi-circular ends is shown in FIG. 4. In the embodiment shown in FIG. 4, the geometrical indentations 26 have an elongated shape consisting of (a) two substantially straight sides that lie alongside each other and are spaced from each other, and (2) two curvilinear ends closing the mutually respective ends of the straight sides, with an elongate center line of each of the geometrical indentations 26 intersecting each of the curvilinear ends and the center of the central opening 22 in the mouthpiece 18. As shown in FIG. 4, each of the two curvilinear ends have a shape of a semi-circle. However, these two curvilinear ends could have other curvilinear shapes such as ovals or other conical shapes.

Another preferred embodiment of the improved inflation of the present invention is shown in FIG. 3, wherein the geometrical indentations 26 have the shape of ovals. The elongate axis of each of the oval-shaped geometrical indentations 26 intersects the center of the central opening 22 in the mouthpiece 18.

Although preferred embodiments of the milking inflations of the present invention have been illustrated and described, it is to be understood that the present disclosure is made by way of example and that various other embodiments are possible without departing from the subject matter coming within the scope of the following claims, which subject matter is regarded as the invention.

What is claimed is:

1. An improvement in a milking inflation for a teat cup assembly in which the milking inflation is characterized by
   (a) a tubular body that is adapted to fit within an elongate shell,
   (b) a head end portion attached to an upper end of said tubular body, said head end portion being adapted to fit over the upper end of said elongate shell to position said tubular body within said elongate shell,
   (c) a peripheral cuff on said head end portion, said peripheral cuff being adapted to surround and sealing engage the upper end of said elongate shell,
   (d) a substantially flat, resilient mouthpiece made of a flexible, elastomeric material, said mouthpiece having a thickness defined by an upper surface and a lower surface which extend radially inwardly from said cuff toward a central axis of said tubular body, and
   (e) a circular, central opening in said mouthpiece adapted to receive a teat of a cow,
   said improvement consisting of
   (f) a plurality of geometrical indentations formed in at least one of said upper and lower surfaces of said mouthpiece, said geometrical indentations being spaced apart and oriented in a circular pattern around said central opening in said mouthpiece,
   (g) an outer portion of each said geometrical indentations being spaced from said peripheral cuff so that said geometrical indentations approach but do not extend to said peripheral cuff,
   (h) an inner portion of each said geometrical indentations being spaced from said central opening so that said geometrical indentations approach but do not extend to said central opening,
   (i) a continuous annular inner section of said mouthpiece extending inwardly beyond said inner portion of each said geometrical indentations to form a continuous annulus surrounding said central opening, with an outer periphery of said annulus being adjacent to and abutting said inner portions of said geometrical indentations, and with an inner periphery of said annulus defining said central opening, and
   (j) said annulus having a uniform thickness which is at least as large as said thickness of the mouthpiece defined by said upper surface and said lower surface of said mouthpiece,
   whereby said plurality of geometrical indentations provide increased flexibility in a portion of the mouthpiece in which said geometrical indentations are formed so as to allow said milking inflation to flex relative to the teat of the cow being milked, and said annulus surrounding said central opening retains sufficient rigidity to provide a firm, sealing engagement with said teat of said cow being milked during the flexing movement of said milking inflation.

2. The improvement in a milking inflation in accordance with claim 1 wherein said geometrical indentations are equally spaced around said central opening in said mouthpiece.

3. The improvement in a milking inflation in accordance with claim 2 wherein said geometrical indentations all have the same shape and dimensions.

4. The improvement in a milking inflation in accordance with claim 2 wherein said geometrical indentations have a combined surface area that is equal to 25 to 65 percent of the surface area of the surface of said mouthpiece in which the geometrical indentations are formed.

5. The improvement in a milking inflation in accordance with claim 4 wherein said geometrical indentations are formed on said upper surface of said mouthpiece.

6. The improvement in a milking inflation in accordance with claim 2 wherein the geometrical indentations each have a depth that is substantially uniform.

7. The improvement in a milking inflation in accordance with claim 6 wherein said depth is substantially the same for each of said geometrical indentations.

8. The improvement in a milking inflation in accordance with claim 6 wherein said depth is equal to about 5 to 35 percent of the thickness of said mouthpiece.

9. The improvement in a milking inflation in accordance with claim 1 wherein said geometrical indentations have the shape of a hexagon.

10. The improvement in a milking inflation in accordance with claim 9 wherein the hexagon-shaped geometrical indentations are oriented such that a center line through a pair of opposite points of each respective hexagon-shaped geometrical indentation intersects a center axis of said opening in said mouthpiece and two opposite sides of each respective hexagon-shaped geometrical indentation are substantially parallel to said center line of that respective geometrical indentation.

11. The improvement in a milking inflation in accordance with claim 10 wherein each of the hexagon-shaped geometrical indentations is elongated in a radial direction from said center axis of said opening in said mouthpiece such that said two opposite sides of each of said geometrical indentations are longer than mutually respective other sides of each of said geometrical indentations.

12. The improvement in a milking inflation in accordance with claim 1 wherein said geometrical indentations have the shape of a circle.

13. The improvement in a milking inflation in accordance with claim 1 wherein said geometrical indentations have an elongated shape consisting of (a) two substantially straight sides that lie alongside each other and are spaced from each other, and (2) two curvilinear ends closing the mutually respective ends of said straight sides, with an elongate center line of each of said geometrical indentations intersecting each of said curvilinear ends and the center of said central opening in said mouthpiece.

14. The improvement in a milking inflation in accordance with claim 13 wherein each of the two curvilinear ends have a shape of a semi-circle.

15. The improvement in a milking inflation in accordance with claim 1 wherein said geometrical indentations have the shape of ovals, with the elongate axis of each of the oval-shaped geometrical indentations intersecting the center of said central opening in said mouthpiece.

* * * * *